Feb. 2, 1954  J. E. SHEA  2,667,782
APPARATUS FOR MEASURING VOLUMES OF SOLID MATERIALS
Filed Feb. 28, 1951  3 Sheets-Sheet 1
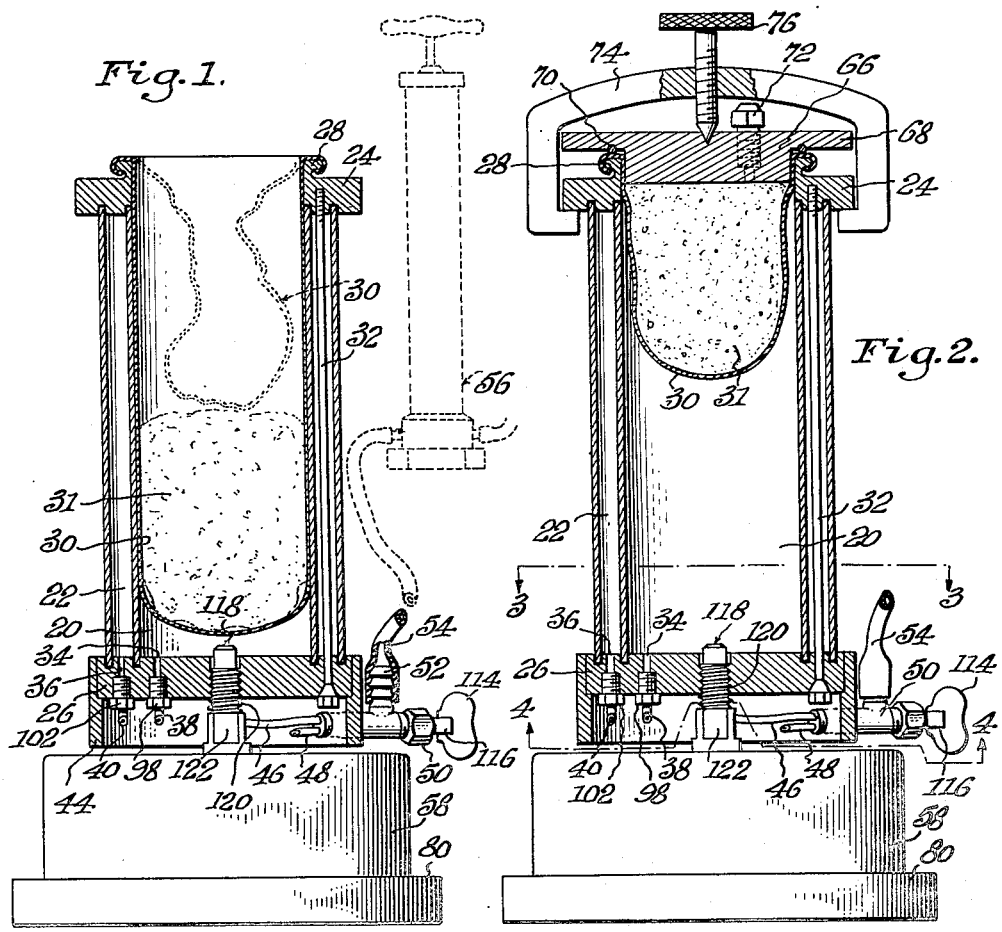
INVENTOR.
John E. Shea

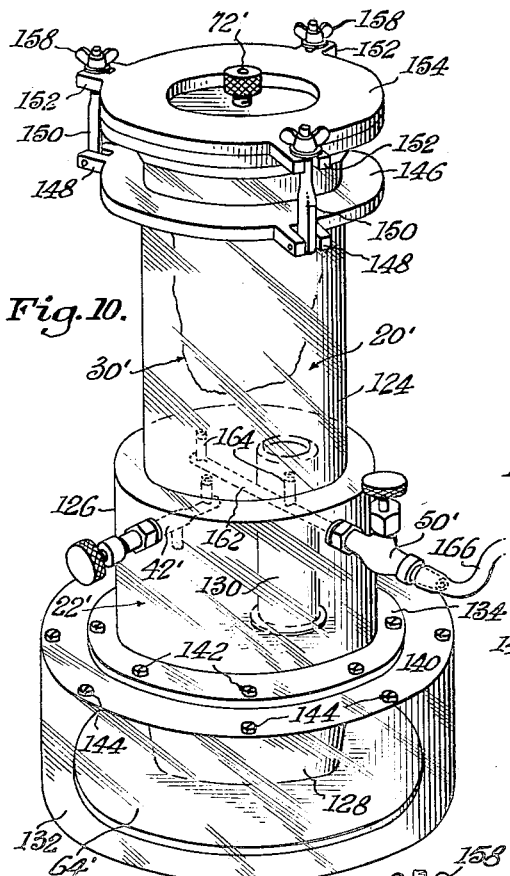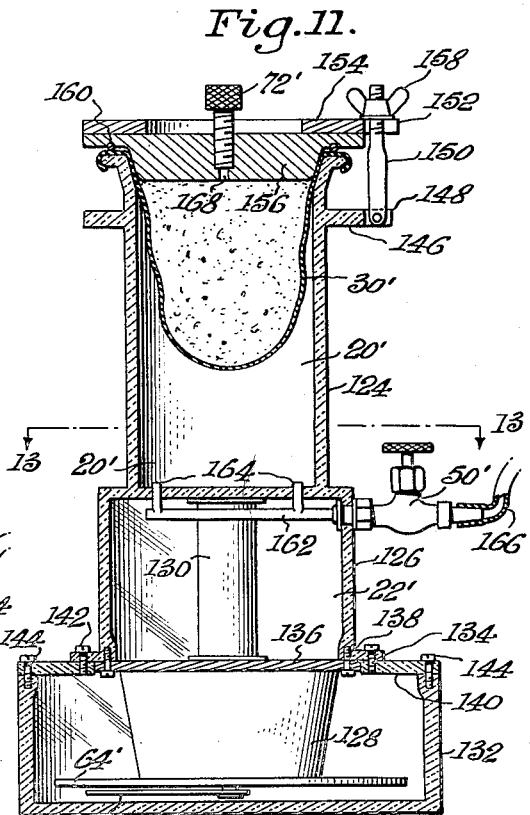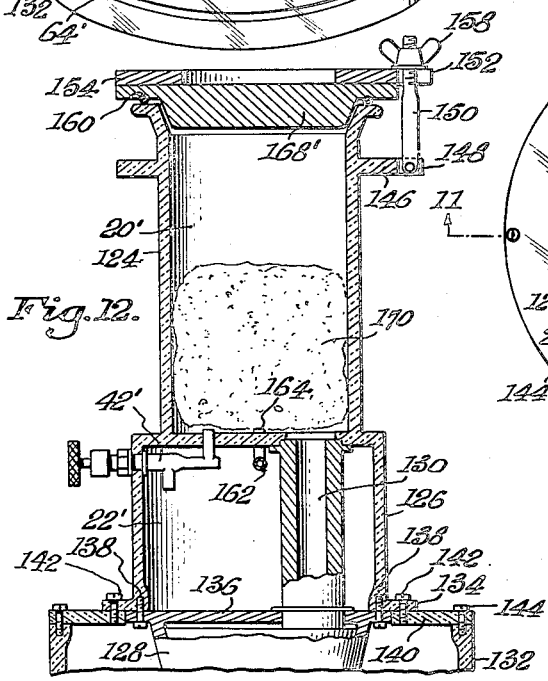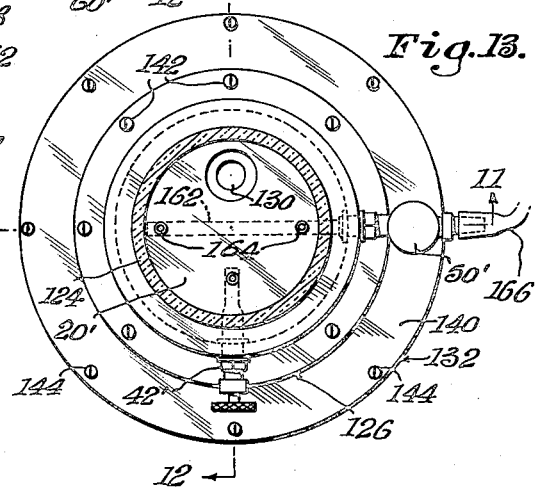
INVENTOR.
John E. Shea

Feb. 2, 1954 — J. E. SHEA — 2,667,782
APPARATUS FOR MEASURING VOLUMES OF SOLID MATERIALS
Filed Feb. 28, 1951 — 3 Sheets-Sheet 3
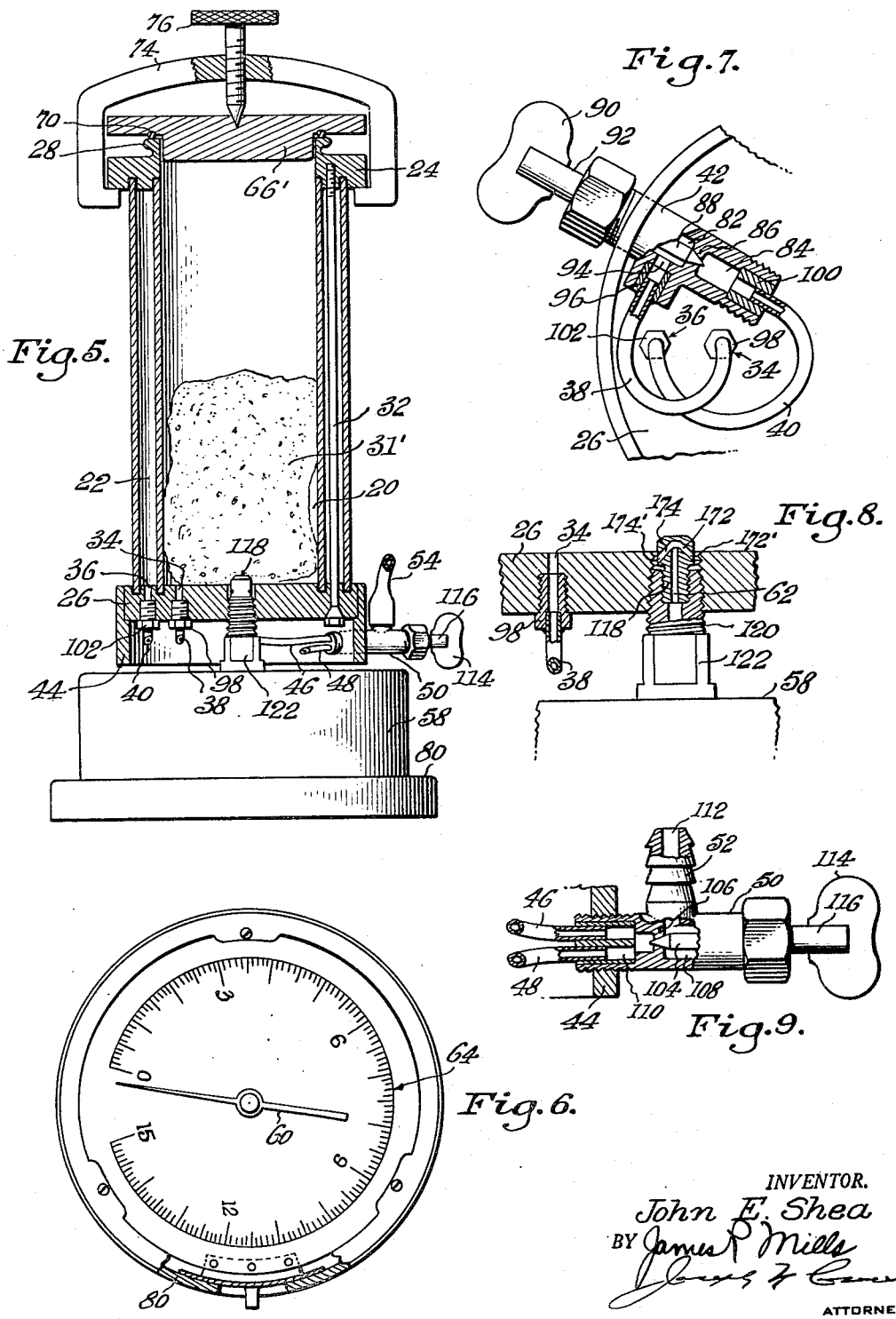
INVENTOR.
John E. Shea Patented Feb. 2, 1954

2,667,782

UNITED STATES PATENT OFFICE 2,667,782

APPARATUS FOR MEASURING VOLUMES OF SOLID MATERIALS

John E. Shea, Fairhaven, Va.

Application February 28, 1951, Serial No. 213,189

3 Claims. (Cl. 73—149)

(Granted under Title 35, U. S. Code (1952), sec. 266)

The invention described herein may be manufactured and used by or for the Government for governmental purposes, without payment to me of any royalty thereon.

The present invention relates to an improved apparatus for rapidly determining the volume and density of a wide variety of materials in a simple and accurate manner, such materials being for example, soils, bitumens, or snows. The invention has for its important object the provision of simple and accurate equipment which directly measures the above values, which is inexpensive to manufacture, and which is sufficiently rugged for field service.

Other objects of the invention will become apparent as the description proceeds, and the features of novelty will be pointed out in the appended claims.

The device of the present invention has been designed primarily for use in extremely cold countries where there is a military interest in snow as a construction material in the snow engineering of roads, aircraft runways, and other Arctic projects.

The instrument of the present invention may be termed, for simplicity, a "volumeter." Generally speaking, it consists of two interconnected air-tight chambers separated by a control valve between the chambers. The chambers may be arranged concentrically, in which event the inner chamber may be considered to be the sample chamber, or the chambers may be disposed one above the other, in which the upper chamber is the sample chamber. The accompanying drawings illustrate the details of both types of construction.

For determining absolute volume, a sample is placed in the sample chamber of the instrument, the chamber is sealed, and air at 15 p. s. i. pressure is pumped in. Then the valve between the chambers is opened and the pressure drop is noted on a gauge. In the instrument direct volume readings are given without the need of calculations.

The underlying principle of the present improved apparatus lies in the combined gas laws of Boyle (Mariotte) and Charles (Gay-Lussac), the combined relationship between which may be expressed by the equation $$\frac{P_1 V_1}{T_1} = \frac{P_2 V_2}{T_2}$$

the T values being absolute temperatures, $P_1$ and $V_1$ being the original pressure and volume, respectively, and $P_2$ and $V_2$ being the changed pressure and volume, respectively.

Since, in operation of the test, it is run at a constant temperature, the T values in the above equation drop out and since the only measurement made is one of change in pressure, no absolute quantities are involved, and only gauge pressure need be considered.

The improved apparatus permits a volume of air under a given pressure to increase in volume and records the resultant pressure drop. The change in pressure is a function of the volume of air, which, in turn, depends on the volume of sample material in the sample chamber. By measuring pressure drops for several known volumes, the pressure gauge of the instrument is calibrated to read directly in cubic centimeters, which is the volume of the sample.

The sample to be measured is placed in the sample chamber, and the pressure in the chamber is raised from atmospheric to 15 p. s. i. gauge pressure with a suitable hand pump. The connecting control valve between the chambers is opened, thus permitting air to expand into the other chamber, which is either the outer concentric chamber or the lower chamber, as will be apparent hereinafter. The pressure drop accompany expansion activates the pressure gauge needle, moving it from 15 p. s. i. to some lower value; but since the dial is calibrated in terms of volume of sample, the answer is read directly.

The specific gravity of a sample is found by dividing the weight of the sample in grams by the volume in cubic centimeters first found as above.

Then, knowing the surface dry specific gravity of a given sand or coarse aggregate, the weight of excess moisture in a wet sample of the same material may be computed readily. Thus, Let
  $y$=weight of moisture in grams
  $x$=dry weight of sample in grams
  $G$=specific gravity of dry aggregate Then
  $x+y$=total weight of sample in grams
  $\frac{x}{G}+y$=total volume of sample in cubic centimeters The total weight has been determined previously, and the total volume can be found in the volumeter of the present invention. The above equations then are solved simultaneously for $y$, the weight of excess moisture.

Field moisture of soils can be found the same way using the absolute dry specific gravity, determined, as above, or an estimated specific gravity based on knowledge of soil types. Assumption of 2.65 specific gravity for most soils would result in a small error in moisture content computations if the direct specific gravity differed slightly from the assumed value.

In clay or other cohesive soils which cannot be penetrated by air at the pressure used, the sample may be made into a slurry by adding measured quantities of water.

After the total volume of slurry is determined, the volume of water added is subtracted, and the moisture content then determined as above.

The bitumen content of a bituminous mix can be determined in much the same manner. If $y$ is the weight of bitumen present, and $x$ is the weight of aggregate plus any moisture present, the simultaneous equations will be $x+y$=total weight of sample in grams $$\frac{x}{G_1}+\frac{y}{G_2}=\text{total volume of sample in c.c.'s.}$$

where $G_1$ is specific gravity of the dry aggregates plus any moisture present, and $G_2$ is the specific gravity of the bitumen. Generally, $G_1$ and $G_2$ will have been established previously.

With the foregoing considerations in mind, attention now is called to the accompanying drawings which illustrate structural details of both modifications of the improved device mentioned above.

In the accompanying drawings:

Fig. 1 represents a vertical axial section of one form of the improved device of the present invention, the view showing a rubber sample-receiving balloon used for density determinations in extended position for receiving a sample of material, the density of which is to be determined, the view illustrating in dotted lines the collapsed position of the said balloon, and also indicating in dotted lines a pressure-controlling pump, the view being taken along the line 1—1 of Fig. 3, looking in the direction of the arrows;

Fig. 2 is a similar view, but showing a cover clamped in place on the cylinders, the view showing the condition of the balloon and sample after pressure is applied to the sample chamber;

Fig. 3 is a horizontal section on the line 3—3 of Fig. 2, looking in the direction of the arrows;

Fig. 4 is a further horizontal section taken on the line 4—4 of Fig. 2, looking in the direction of the arrows;

Fig. 5 is a view similar to Figs. 1 and 2, but showing a modification in which the rubber balloon is omitted for volume determinations;

Fig. 6 is a bottom plan view of the device, illustrating the gauge dial and indicating pointer;

Fig. 7 is a detailed sectional view of the pressure-equalizing valve;

Fig. 8 is a detailed sectional view of the air-communicating fitting used between the sample chamber and the gauge chamber;

Fig. 9 is a detailed sectional view of the pressure and exhaust valve;

Fig. 10 is a perspective view illustrating a still further modified form of the improved apparatus;

Fig. 11 is a vertical sectional view of the modification of Fig. 10, the view being taken on the line 11—11 of Fig. 13;

Fig. 12 is a vertical section of the modified form of the device, taken on the line 12—12 of Fig. 13;

Fig. 13 is a horizontal section through the modified form of the apparatus, the view being taken on the line 13—13 of Fig. 11.

Reference now may be made more particularly to the drawings, and first to the form of the apparatus shown in Figs. 1 and 2, which is suitable for density determinations. In this form of the apparatus, the sample chamber 20 and the auxiliary or air chamber 22 are concentrically disposed and are maintained suitably spaced by a top closure 24 and bottom closure 26, the latter being provided with valves and valve-openings, as will be described hereinafter.

Mounted on the top closure 24, which is provided with a flange 28, is a flexible, elastic bag-like member or balloon 30, which is stretched tightly on the flange 28, this balloon 30 extending into the sample chamber 20. The end closure members 24 and 26 are maintained in suitably spaced relation by spaced tie-rods 32. The chambers 20 and 22 communicate through ports 34 and 36 extending through the bottom closure 26, the port 34 opening into the chamber 20 and the port 36 opening into the air chamber 22, these ports having connected to them tubes 38 and 40, respectively, which tubes lead into, and are controlled by, a valve 42, the latter entering the interior of an annular mounting 44 through the side thereof, this mounting 44 carrying the assembly which has been described above. Also passing through the bottom closure 26 and opening into the chamber 20 are tubes 46 and 48 that open into and are controlled by a valve 50. This valve 50 is provided with a nipple 52, which serves as a connection for a tube 54 that leads to a hand pump 56, which is of any standard construction adapted to exhaust and to compress air, selectively, actuation of which controls amounts of pressure in the sample chamber 20.

The sample chamber 20 communicates with a bottom chamber 58 in which is positioned the gauge and pressure-operated means therefor, the said pressure-operated means actuating pointer 60 responsively to variations in pressure in the sample chamber 20, the communication between the sample chamber 20 and the gauge chamber 58 being through port 62, the pointer 60 operating over a scale 64 which is calibrated directly in volume of sample 31 which is being tested.

When operating the device for density determinations, the balloon 30 is employed, the pump 56 is operated to exhaust air from the sample chamber 20, this causing the flexible balloon 30 to open for receiving the sample 31, which is an undisturbed sample of the material being tested. During this period of exhaustion, the valve 42 is closed.

In using this device for density determinations (apparent specific gravity) the pump 56 is operated to exhaust the air between the balloon 30 and the wall of the sample chamber 20, suction being applied to the chamber 20 through tubes 46 and 48 and valve 50. The exhaustion of this air expands the balloon 30, this expansion permitting easy ingress of any reasonably shaped lump sample. When the cover is removed, the balloon 30 remains expanded for reception of the sample. Subsequent to the exhaustion of air and placement of the sample, the cover cap 66 is placed in closing position over the chamber 20 with flange 68 of the cap engaging the fastened portions of the balloon 30 mounted on flange 28 with an intermediate sealing gasket 70. The cap 66 is provided with an air escape valve 72 and is held by a clamp comprising locking bracket 74 and clamping screw 76.

When the cover 66 is replaced in closing position and clamped, the pump 56 is operated to pump air into the chamber 20 until the pressure rises to a selected amount. Air is pumped into the chamber 20 until the pointer 60 on the gauge indicates a pressure of, for example, 15 p. s. i. in the chamber. This ambient pressure collapses the balloon 30 tightly around the sample, any excess air being forced out through the air escape valve 72. Then the connecting valve 42 between the sample chamber 20 and the auxiliary chamber 22 is opened, and the apparent volume of the sample is read on the gauge. This volume divided into the sample's weight and the result multiplied by 62.4 gives the density in lbs./cu. ft.

Further uses of the improved device will be indicated hereinafter. For determination of values other than densities, a modified equipment such as shown in Fig. 5 is employed, where the balloon 30 is omitted and a solid cover 66' is employed, the escape valve 72 being omitted.

(a) Thus, for the determination of absolute dry specific gravity, it is necessary only to record the dry weight of the sample and its volume as measured by the improved apparatus and as indicated on the dial 64 by the pointer 60. The specific gravity of the sample is given by the weight of the sample divided by the absolute volume as measured by the present improved apparatus.

(b) In determining the surface dry specific gravity of sand and gravel aggregates, the procedure is the same as in (a) above, except that several observers should be used to select what each observer thinks to be the surface dry condition, this showing the effect of the personal error in establishing a surface dry condition for a given aggregate. Having established the surface dry specific gravity of a given aggregate, the excess moisture may be determined as follows:

Let
$x$ = weight of surface dry portion of a sample of aggregate
$y$ = weight of excess moisture
$G_1$ = specific gravity of surface dry aggregate.

Thus:
(1)  $x+y$ = total weight of sample in grams
(2)  $\frac{x}{G_1}+y$ = total volume of sample in c.c.'s If $G_1$ has been established previously (or can be estimated), Equations 1 and 2 can be solved simultaneously, and it then is a simple matter to determine the percent excess moisture in the sample from (3)  $100\frac{y}{x}$ = percent excess moisture (c) The field moisture of soils is determined in the same manner as the excess moisture in aggregates as shown in (b) above. The value of $G_1$ in this case will be the absolute dry specific gravity as determined by the method outlined in (a) above, or as estimated.

(d) The bitumen content of a bituminous mix may be determined as follows:

Let
$x$ = weight of aggregates plus any moisture that may be present
$y$ = weight of bitumen present Then:
$G_1$ = specific gravity of dry aggregates or moist aggregates if moisture is present
$G_2$ = specific gravity of bitumen Then:
(4)  $x+y$ = total weight of sample in grams
(5)  $\frac{x}{G_1}+\frac{y}{G_2}$ = total volume of sample in c.c.'s If $G_1$ and $G_2$ have been established previously, or can be estimated, Equations 1 and 2 can be solved simultaneously and then the percent by weight of bitumen may be calculated from (6)  $100\frac{y}{x}$ = percent bitumen (e) To determine the organic content of soil, the material first must be dried to constant weight at a temperature below 100° C. in order not to burn any organic matter that may be present.

Let
$x$ = weight of soil
$y$ = weight of organic matter present
$G_1$ = specific gravity of soil
$G_2$ = specific gravity of organic matter
$V$ = volume of sample
$V_1$ = volume of organic matter Then:
(7)  $x+y$ = total weight of sample in grams
(8)  $\frac{x}{G_1}+\frac{y}{G_2}$ = total volume of sample in c.c.'s Since dry organic matter is very light in weight for large volumes of material, it is more feasible to express the percent of organic matter in terms of the percent by volume of the total volume of the sample, thus:

(9)  $\frac{100}{G_2 V}y$ = percent $V_1$

It may be pointed out that the present device measures volumes of samples with high precision when such volumes are greater than 300 c.c.'s. Therefore, volumes measured should be as close as practicable to the maximum capacity of the device. For samples of small volume, inserts of previously measured volume should be used to bring the total measured volume into the most accurate range of the dial.

It will be seen from the foregoing that the instrument of the present invention consists principally of two chambers 20 and 22 which are interconnected and controlled by a valve 42, which can be opened or closed. The inner chamber of Figs. 1, 2, and 5, designated at 20, is the sample chamber, and the outer chamber 22 is the auxiliary chamber. With the valve 42 closed, a sample 31', the volume of which is to be determined, is placed in the sample chamber 20 and the cover 66' is clamped air-tight by means of the clamps 74 and thumb screws 76. A definite amount of air pressure (15 lbs./sq. in.) is pumped by pump 56 through the pressure-exhaust valve 50, and is registered on the pressure gauge 64 mounted on the bottom of the gauge chamber 58, while the air in the auxiliary chamber 22 is held at atmospheric pressure. Then the connecting valve 42 is opened and there is a pressure drop as air under excess pressure in chamber 20 passes into the auxiliary chamber 22, the amount of this pressure drop being a function of the volume of the sample to be measured in the sample chamber 20. The resulting pressure is indicated on the gauge 64 on the bottom of the apparatus, which is calibrated to read directly in volume (cubic centimeters).

The various intended field uses for the present instrument are indicated by the foregoing description. In the determination of absolute volumes in which the air is allowed to penetrate the sample, the solid cover 66' is used, this differing from the cover 66 only in that no air escape valve is provided at the center of the cover, as is provided in the cover 66. As the dial on the gauge is calibrated for the instrument when used with the solid cover 66', a small correction must be made in the dial reading to allow for any differences in the volume of the chamber 20 when it is used, for example, with a different cover arrangement such as that indicated at 66.

As has been pointed out above, when the present instrument is used for density determinations (apparent specific gravity), the cover 66 is employed having the air escape valve 72 provided therein, and the balloon 30 is stretched over flange 28 of the annular closure 24. Air is exhausted from between the balloon 30 and the walls of chamber 20 through the pressure-exhaust valve 50. This causes the balloon to expand to permit easy ingress of any reasonably shaped lump sample 31. When the cover is put in place and pressure (15 lbs./sq. in.) is applied to the chamber 20, the balloon collapses tightly around the sample, the apparent volume of which is to be measured, and any excess air between the balloon 30 and the sample 31 is forced out of the air escape valve 72. Then the central valve 42 between the sample chamber 20 and the auxiliary chamber 22 is opened, and the apparent volume of the sample is read, and the density determined as has been described above.

It will be seen from the drawings that the connecting valve 42 and the pressure-exhaust valve 50 are mounted in a collar 44 in which is seated the bottom closure 26. Pressure in the sample chamber 20 is transmitted to pressure-actuated mechanism in chamber 58 for the gauge for actuating the gauge needle 60, the gauge dial 64 being mounted in a collar 80 on the bottom periphery of the housing for chamber 58. The connecting valve 42 comprises a pair of axially aligned chambers 82 and 84 (see Fig. 7) which are separated by a web 86 containing a port which is opened and closed by a needle valve 88 that is advanced or retracted by corresponding manipulation of the actuating key 90 which fits into a bifurcation in the actuating stem 92 for the valve 88. Opening into the valve chamber 82 from a lateral direction is a passage 94 which receives a coupling 96 to which is connected the tube 38 which is also connected to a coupling 98 in the port 34 communicating with the interior of sample chamber 20. The other chamber 84 of valve 42 receives a coupling 100 into which the tube 40 is fitted, this tube leading to a coupling 102 mounted in the port 36 which opens into the auxiliary chamber 22, so that when the valve 88 is unseated, the tubes 38 and 40 are placed into communication.

The valve 50 is shown as comprising a needle valve 104 which opens and closes a port in a web 106 that divides the valve internally into chambers 108 and 110, the tubes 46 and 48 being mounted in this latter chamber, the nipple 52 having a passage 112 therethrough which communicates with chamber 108, so the pump 56 is brought into communication with the interior of chamber 20 when the valve 104 is opened by turning key 114 secured to valve stem 116.

A port or passage 62 which connects the chamber 20 with the gauge chamber 58 extends through a fitting 118, but terminates short of the top surface thereof, which fitting is threaded into a threaded complemental fitting 120 that is threaded in the bottom member 26 of the chambers 20 and 22. The threaded fitting 120 also is threadedly mounted in a socket 122 which projects from the top of the chamber 58 and which has an opening therethrough communicating with the interior of chamber 58.

The modification of the structure shown in Figs. 10 through 13 is similar to the form of the device shown in the preceding views and described above, and operates in a similar manner as described above. In this modification, the chambers are superposed, the sample chamber 20' being superposed on the auxiliary chamber 22' instead of being mounted in concentric relation, as in the precedingly described form, the sample chamber 20' being defined by housing 124, and the auxiliary chamber 22' by housing 126. In the modification of Figs. 10 through 13, the housings 124 and 126 are integral in construction. The sample chamber 20' communicates with the gauge chamber 128 through a duct 130 for transmitting variations in pressure in the chamber 20' to the gauge-actuating instrumentalities (not shown) in the gauge chamber 128. The gauge chamber 128 carries a dial 64', similar to dial 64, and likewise is calibrated to read directly in volumes, and an indicating pointer 60' moving over the dial. The gauge chamber 128 is housed in a transparent housing 132.

It will be noted that the housing 126 of the auxiliary chamber 22' is formed with a flange 134 and the gauge chamber 128 has an annular flange 136 thereon, which is adapted to fit the housing 126 around its bottom periphery and is secured thereto by screws 138. An annulus 140 abuts the flange 134 on the under surface of this flange and is secured thereto by screws 142, additional screws 144 securing annulus 140 to housing 132 inclosing the gauge chamber. The housing 124 also is provided with an annular flange collar 146 which carries spaced ears 148 between which are pivotally mounted locking arms 150 which are adapted to be received between pairs of lugs 152 on clamping ring 154 for clamping cover 156 in position on housing 124 of sample chamber 20'. The locking arms 150 are threaded on their upper ends for reception of locking wing nuts 158 which hold arms 150 in locking position and clamp the clamping ring 154 tightly against the cover 156. In the form of apparatus shown in Figs. 10 and 11, a rubber balloon 30' is secured to the upper rim of the housing 124, the cover 156 securing the balloon 30' through pressure exerted thereon through an annular gasket 160. This balloon is employed when density determinations are to be made, as has been described above. In this case, the cover 156 has an opening 168 therethrough, which receives air-release valve 72' that is similar to the valve 72.

A connecting valve 42' interconnects the sample chamber 20' and the auxiliary chamber 22' as will be apparent, which valve is operated in the same manner as the connecting valve 42 and equalizes the pressure between the sample chamber 20' and the auxiliary chamber 22'. A pressure-exhaust valve 50', which is similar to valve 50, also is provided, this valve 50' being connected to a pipe 162 which has branches 164 opening into the sample chamber 20'. The valve 50' is connected to a pressure-exhaust pump (not shown, but like pump 56) through a tubular connection 166.

The modification shown in Fig. 12 is similar, except that the balloon 30' is omitted, and a solid cover 168' is employed, the sample to be tested, which is indicated at 170, being introduced directly into the pressure chamber.

The operation of these modifications is the same as that set forth above in connection with the embodiments illustrated in Figs. 1 through 5, and the uses are the same.

It will be seen from Fig. 8 that the air passage 62 which connects the sample chamber 20 with the gauge chamber 58 communicates at its top with downwardly inclined, oppositely disposed passages 172 and 174 which terminate in ports 172' and 174' in the periphery of the fitting 118. The solid top of this fitting and the downward slope of the air passages 172 and 174 minimize any tendency of dirt or particles of the sample being tested from entering into the gauge-actuating mechanism and inhibiting accurate operation thereof.

It may be noted also that the pressure of 15 p. s. i. indicated in the foregoing description as being the pressure built up in the sample chamber for the test is merely an arbitrary value, employed as being the most satisfactory in practical operation. However, any other pressure may be used, for example, 10 p. s. i. or 20 p. s. i., insofar as concerns operational procedure. Also, it is found in practice that it is desirable to use the two tubes 46 and 48, interconnecting the sample chamber with the pressure-exhaust valve for assuring a more even expansion of the balloon 30 when this element is being used for density determinations.

For calibrating the dial 64 so that sample volumes are indicated by a pointer 60 reacting to pressures, there may be used a series of known or standard volumes ranging from 100 to 600 c. c. in about 50 c. c. increments.

First, a 15 p. s. i. pressure is applied to the sample chamber with the apparatus empty, the connecting valve between the chambers is opened and observation made where the pointer stops after the pressure change. This is the zero volume reading. Then with the 100 c. c. standard volume in the sample chamber the operation is repeated and where the pointer stops is the 100 c. c. mark on the dial, and so on up the scale with other known volumes. As each volume increment is added, the pointer swings through an arc on the dial. From a calibration curve established by these points, intermediate volumes can be located, and such intermediate volumes located on the arc of the dial.

It is found in practice that the present device is relatively inaccurate on samples with volumes below 300 c. c. However, inserts of known volumes can be put in with smaller samples to bring the total volume up into accurately measurable range. The known volume then must be subtracted from the dial reading to get the volume of the sample being tested.

For maximum precision in determining volumes of the above standard inserts, a water displacement method may be employed. The standard inserts are immersed collectively in a tank of water and there is determined what total volume of water the inserts displace. This procedure is repeated a number of times (for example, six times) and the average is taken as the total volume. This divided into the total weight of the inserts gives the specific gravity of the material of which the inserts are made. Then the weight of each individual sample divided by its specific gravity gives its volume.

Having thus described my invention, what I claim as new and wish to secure by Letters Patent is:

1. Apparatus for measuring volumes of samples of solid materials, which comprises a sample chamber for receiving the sample, an auxiliary chamber communicating with the sample chamber through a pressure-conducting conduit, closure means for the sample chamber, an expansible balloon member secured to the sample chamber and depending therein, means for exhausting air from the sample chamber for expanding the balloon member to receive a sample of material therein, means for increasing pressure in the sample chamber following exhaustion thereof, to a value above that of the ambient atmosphere for compressing the said balloon member about the sample, a connecting valve in the said conduit intermediate the sample chamber and the auxiliary chamber, and pressure-responsive means communicating with the sample chamber for indicating the increased pressure in the sample chamber and resulting reduced pressure responsively to equalization of pressure between the chambers, the said reduction in pressure corresponding to the volume of the sample of material in the balloon member.

2. Apparatus for measuring volumes of samples of solid materials, which comprises a sample chamber for receiving the sample, an auxiliary chamber communicating with the sample chamber through a pressure-conducting conduit, an expansible balloon member secured to the sample chamber and depending therein, means for exhausting air from the sample chamber for expanding the balloon member to receive a sample to be measured, means for increasing pressure in the sample chamber following exhaustion thereof to a value above that of the ambient atmosphere for compressing the said balloon member about the sample, a cover for the sample chamber, a pressure release valve in the cover communicating with the balloon member interiorly thereof for releasing air between the sample and the balloon member, such air being expelled by the increasing pressure around the balloon member as the said balloon member is pressed thereby into conformity with the sample therein, means for clamping the cover in position, a connecting valve in the said conduit intermediate the sample chamber and auxiliary chamber, and pressure-responsive means communicating with the sample chamber for indicating the increased pressure in the sample chamber and resulting reduced pressure therein responsively to equalization of pressure between the chambers, the said reduction in pressure corresponding to the volume of the sample in the balloon member.

3. Apparatus for measuring volumes of weighed samples of solid materials which comprises a plurality of superposed chambers, one of which is a sample chamber, another of which is an auxiliary chamber, and still another of which is a gauge chamber, the said chambers being superposed in the foregoing order with the sample chamber and the gauge chamber being terminal chambers, and the auxiliary chamber intermediate the sample chamber and the gauge chamber, cover means for the resulting assembly, means clamping the cover means to the sample chamber, a separating member between the sample chamber and the auxiliary chamber and defining a bottom for the sample chamber and top for the auxiliary chamber, the gauge chamber being also separate from the auxiliary chamber, means communicating with the sample chamber for enabling pressures in the sample chamber to be increased to a selected value, means interconnecting the sample chamber and the auxiliary chamber, a control valve in the said means for equalizing pressure between the sample chamber and the auxiliary chamber responsively to opening the valve, a conduit interconnecting the sample chamber and the gauge chamber for transmitting pressure from the gauge chamber to the sample chamber, and a pressure-actuated gauge in the gauge chamber for indicating amounts of pressure in the sample chamber both before and after equalization thereof in the auxiliary chamber.

JOHN E. SHEA.

References Cited in the file of this patent

UNITED STATES PATENTS

| Number | Name | Date |
|---|---|---|
| 1,885,926 | Lewis | Nov. 1, 1932 |
| 2,113,686 | Gift | Apr. 12, 1938 |
| 2,270,505 | Burleson | Jan. 20, 1942 |
| 2,314,540 | Huntington | Mar. 23, 1943 |
| 2,378,849 | Helleberg et al. | June 19, 1945 |
| 2,381,821 | Helleberg et al. | Aug. 7, 1945 |
| 2,400,411 | Hauptman | May 14, 1946 |